United States Patent
Jianhua et al.

(10) Patent No.: US 12,385,586 B2
(45) Date of Patent: Aug. 12, 2025

(54) COMPRESSION TEETH RING CONNECTION PIPE FITTING

(71) Applicants: Guolin (Tianjin) Technology Co., Ltd., Tianjin (CN); Shanghai Zep Tech Co., Ltd, Shanghai (CN)

(72) Inventors: Ye Jianhua, Tianjin (CN); Zhou Qingnian, Beijing (CN)

(73) Assignees: Guolin (Tianjin) Technology Co., Ltd., Tianjin (CN); Shanghai Zep Tech Co., Ltd, Shanghai (CN)

( * ) Notice: Subject to any disclaimer, the term of this patent is extended or adjusted under 35 U.S.C. 154(b) by 71 days.

(21) Appl. No.: 18/500,230

(22) Filed: Nov. 2, 2023

(65) Prior Publication Data
US 2024/0068611 A1    Feb. 29, 2024

Related U.S. Application Data

(63) Continuation-in-part of application No. 17/470,715, filed on Sep. 9, 2021, now Pat. No. 11,873,924.

(30) Foreign Application Priority Data

Oct. 20, 2020   (CN) .......................... 202011124020.1

(51) Int. Cl.
*F16L 37/092*   (2006.01)

(52) U.S. Cl.
CPC ................................ *F16L 37/0925* (2013.01)

(58) Field of Classification Search
CPC ...... F16L 37/091; F16L 37/095; F16L 37/098; F16L 37/0925; F16L 25/12
See application file for complete search history.

(56) References Cited

U.S. PATENT DOCUMENTS

2010/0314863 A1\* 12/2010 Ohara .................. F16L 37/091
                                                                285/31

\* cited by examiner

*Primary Examiner* — Aaron M Dunwoody
(74) *Attorney, Agent, or Firm* — JEEN IP LAW, LLC

(57) ABSTRACT

The present disclosure provides a compression teeth ring connection pipe fitting, which includes a pipe fitting body and a sealing component; the pipe fitting body includes a middle pipe section, a first flared section, and a second flared section; a diameter of the first flared section is greater than a diameter of the middle pipe section, and a first limit platform is formed at a connection position between the two; a diameter of the second flared section is greater than that of the first flared section, and a second limit platform is formed at a connection position between the two; the sealing component includes a sealing ring, a high temperature sealing ring, and a teeth ring that are coaxial and sequentially arranged; inner rings of the sealing ring, the high temperature sealing ring, and the teeth ring form a space for nesting a steel pipe body.

17 Claims, 27 Drawing Sheets

COMPRESSION TEETH RING CONNECTION PIPE FITTING

CROSS-REFERENCE TO RELATED APPLICATIONS

This application is a continuation-in-part of U.S. patent application Ser. No. 17/470,715, filed on Sep. 9, 2021, which claims priority to Chinese Patent Application No. 202011124020.1 filed on Oct. 20, 2020. The afore-mentioned patent applications are hereby incorporated by reference in their entireties.

TECHNICAL FIELD

The present disclosure relates to the technologies field clamp pipe fittings, and in particular, to a compression teeth ring connection pipe fitting.

BACKGROUND

A pipeline is a device that is connected by pipes, pipe connectors, and valves to transport fluids. Generally, after being pressurized by a blower, compressor, pump, and boiler, the fluid flows from the high-pressure part of the pipeline to the low-pressure part thereof, and can also be transported using its own pressure or gravity.

In the existing technology, traditional fluid transmission pipelines are generally used for thick-walled or thin-walled pipe fittings, which are connected by pipe fittings. Thread connections are usually used between pipe fittings, which results in poor sealing performance, low installation efficiency, and inability to meet leakage prevention standards in high temperature environments.

SUMMARY

The purpose of the present disclosure is to provide a compression teeth ring connection pipe fitting to alleviate a problem of poor sealing between the pipe fitting and the pipeline in the prior art, and an inability to meet leakage prevention standards in high temperature environments.

The present disclosure provides a compression teeth ring connection pipe fitting connecting between two steel pipe bodies. The compression teeth ring connection pipe fitting includes a pipe fitting body and a sealing component;
the pipe fitting body includes a middle pipe section, a first flared section, and a second flared section, where the first flared section and the second flared section are extended along an axis of the pipe fitting body at both ends thereof; a diameter of the first flared section is greater than a diameter of the middle pipe section, and a first limit platform is formed at a connection position between the two; the first limit platform limits an installed steel pipe body in an axis direction; a diameter of the second flared section is greater than the diameter of the first flared section, and a second limit platform is formed at a connection position between the two;
the sealing component includes a sealing ring, a high temperature sealing ring, and a teeth ring that are coaxial and sequentially arranged; inner rings of the sealing ring, the high temperature sealing ring, and the teeth ring form a space for nesting the steel pipe body; the second limit platform limits the sealing ring in an axis direction.

In an embodiment of the present disclosure, the second flared section is inwardly formed with a first annular boss in a radial direction;
the second flared section has a maximum wall thickness at the first annular boss, and a sealing ring limit groove is formed between the first annular boss and the first limit platform to accommodate the sealing ring;
an inner diameter of the first annular boss is larger than an outer diameter of the high temperature sealing ring.

In an embodiment of the present disclosure, a second annular boss is formed inwardly at an edge of a socket of the second flared section in the radial direction;
a teeth ring limit groove is formed between the first annular boss and the second annular boss to accommodate the teeth ring.

In an embodiment of the present disclosure, the second flared section has a same wall-thickness at each position of the second flared section.

In an embodiment of the present disclosure, at least one side of the high temperature sealing ring is recessed inwardly to form one groove.

In an embodiment of the present disclosure, at least one side of the high temperature sealing ring is recessed inwardly to form multiple grooves, the multiple grooves are spaced radially along the high temperature sealing ring in a radial direction.

In an embodiment of the present disclosure, an opening of the groove gradually increases from an inside to an outside.

In an embodiment of the present disclosure, a cross-sectional shape of the groove is trapezoidal or triangular.

In an embodiment of the present disclosure, both end surfaces of the high temperature sealing ring are planar surface and the high temperature sealing ring has a same wall-thickness at each point.

In an embodiment of the present disclosure, the high temperature sealing ring is made of stainless steel, copper, or graphite.

In an embodiment of the present disclosure, the teeth ring includes a teeth ring body and an inner ring protruding from the teeth ring body, and the inner ring is a toothed shaped structure;
the teeth ring body is in an open ring structure;
the toothed structure is configured to insert into the steel pipe body when being subjected to a mutual compression with the steel pipe body.

In an embodiment of the present disclosure, the teeth ring body is in a "C" shaped structure and is made of a radially shrinkable metal material.

In an embodiment of the present disclosure, the toothed shape structure includes multiple teeth spaced along an extension direction of the teeth ring body, and the teeth are extended from the inner ring of the teeth ring body towards its axis direction.

In an embodiment of the present disclosure, the toothed shaped structure is arranged in two rows, and some teeth of the two rows of toothed shaped structure are faced with each other.

In an embodiment of the present disclosure the toothed shaped structure is arranged in two rows, and some teeth of the two rows of toothed shaped structure are misaligned with each other.

In an embodiment of the present disclosure, the toothed shaped structure is arranged in a row, and multiple teeth of the row of toothed shaped structure are arranged at equal intervals.

In an embodiment of the present disclosure, multiple teeth of the toothed shaped structure are arranged on an edge of at least one side of the teeth ring body.

The compression teeth ring connection pipe fitting provided by the present disclosure has at least the following beneficial effects:

during a specific connection process, the steel pipe body is inserted into the pipe fitting body, and an insertion end of the steel pipe body abuts against the first limit platform. The first limit platform limits the steel pipe body in an axis direction to prevent the steel pipe body from shifting along the axial direction; at the same time, the steel pipe body can be sleeved in a space formed by the sealing ring, the high temperature sealing ring, and the teeth ring. The second limit platform can limits the sealing ring in an axis direction, which can prevent the sealing ring from shifting along the axial direction; after the aforementioned installation is completed, a position of the second flared section can be tightened with a help of a crimping tool, the second flared section is forced to contract inwardly, so that inner rings of the sealing ring, the high temperature sealing ring, and the teeth ring are tightly attached to an outer circumference of the steel pipe body. By setting the sealing ring, a connection sealing between the steel pipe body and the pipe fitting body can be improved. Due to a melting of the sealing ring in a high temperature environment and losing the sealing effect, the high temperature sealing ring is provided at an outer side of the sealing ring. The high temperature sealing ring can replace the sealing ring and play a sealing role after the sealing ring loses its sealing effect. In a general design, the high temperature sealing ring meets a certain leakage standard, which can slowly release high temperature and high pressure inside the pipeline, thus it has a high-pressure resistance, thereby avoiding explosion accidents in the pipeline. And, the setting of the teeth ring can ensure a reliable and stable connection between the steel pipe body and the pipe fitting body, which plays a certain tensile and torsional role. It can be seen that the compression teeth ring connection pipe fitting not only has good connection sealing performance, but also can be suitable for high temperature environments. In high temperature environments, it also has good connection sealing performance, playing a role in preventing leakage. In addition, during a specific installation process, the steel pipe body is inserted into the pipe fitting body, and the insertion end of the steel pipe body abuts against the first limit platform. The first limit platform can limit the steel pipe body in the axial direction. At the same time, the steel pipe body is sleeved in the space formed by the sealing ring, the high temperature sealing ring, and the teeth ring, which renders an entire installation process relatively simple and easy to operate.

BRIEF DESCRIPTION OF DRAWINGS

In order to provide a clearer explanation of the specific embodiments of the present disclosure or the technical solutions in the prior art, a brief introduction will be given to the drawings required for the specific embodiments or the description of the prior art. It is obvious that the drawings in the following description are some embodiments of the present disclosure. For ordinary technical personnel in the art, other drawings can be obtained based on these drawings without any creative work.

Figure 1:
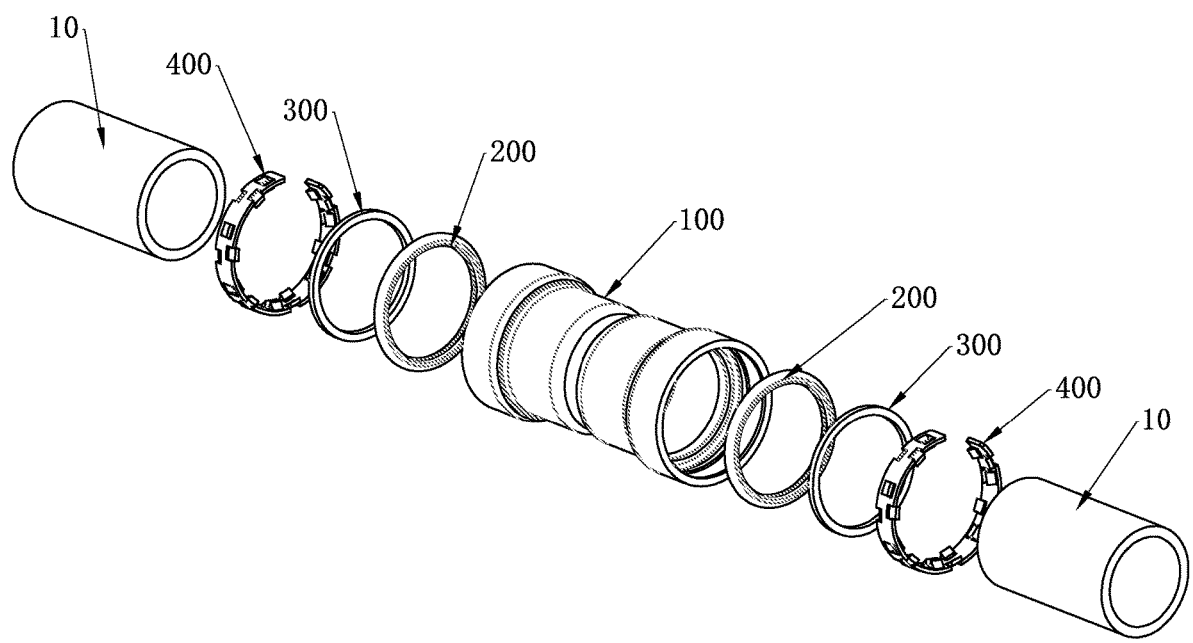
FIG. 1 is a schematic diagram of a split structure of a compression teeth ring connection pipe fitting and two steel pipe bodies provided in an embodiment of the present disclosure.

Numeral reference: 10—Steel pipe body;
100—Pipe fitting body; 110—Middle pipe section; 120—First flared section; 130—Second flared section; 140—First limit platform; 150—Second limit platform; 160—Sealing ring limit groove; 170—Teeth ring limit groove; 180—Shrinkage section; 131—First annular boss;
132—Second annular boss;
200—Sealing ring;
300—High temperature sealing ring;
400—Teeth ring; 410—Teeth ring body; 420—Teeth.

DESCRIPTION OF EMBODIMENTS

In order to render the purpose, technical solution, and advantages of the embodiments of the present disclosure clearer, the following will provide a clear and complete description of the technical solution in the embodiments of the present disclosure in combination with the drawings. Obviously, the described embodiments are a part of the embodiments of the present disclosure, not all of them. The devices of the embodiments of the present disclosure typically described and shown in the drawings can be arranged and designed in various different configurations.

Therefore, the detailed description of the embodiments of the present disclosure provided in the drawings is not intended to limit the scope of the present disclosure, but only to represent some embodiments of the present disclosure. Based on the embodiments in the present disclosure, all other embodiments obtained by ordinary technicians in the art without creative work fall within the protection scope of the present disclosure.

It should be noted that similar reference and letters represent similar terms in the following drawings, so once a term is defined in one drawing, further definition and explanation are not required in subsequent drawings.

In the description of the present disclosure, it should be noted that the terms "center", "up", "bottom", "left", "right", "vertical", "horizontal", "inside", "outside", etc. indicate an orientation or position relationship based on the orientation or position relationship shown in the drawings, or the orientation or position relationship that is commonly placed when the product of the disclosure is used, solely for a convenience of describing the present disclosure and simplifying the description, rather than indicating or implying that the device or component referred to must have a specific orientation, be constructed and operated in a specific orientation, therefore it cannot be understood as a limitation of the present disclosure. In addition, terms "first", "second", "third", etc. are only used to distinguish descriptions and cannot be understood as indicating or implying relative importance.

In addition, terms such as "horizontal" and "vertical" do not mean that the component is required to be absolutely horizontal or suspended, but can be slightly tilted. If "horizontal" only refers to its direction being more horizontal compared to "vertical", it does not mean that the structure must be completely horizontal, but can be slightly tilted.

In the description of the present disclosure, it should also be noted that unless otherwise specified defined and limited, terms "setting", "installation", "connection to", and "connection with" should be broadly understood, for example, they can be a fixed connection, a detachable connection, or an integrated connection; it can be a mechanical connection or an electrical connection; it can be a directly connection, or an indirect connection through an intermediate medium, or it can be an internal connection between two components. For ordinary technical personnel in this field, specific meanings of the above terms in the present disclosure can be understood in specific circumstances.

The following will provide a detailed explanation of some embodiments of the present disclosure in combination with the drawings. Without conflict, the following embodiments and the features in the embodiments can be combined with each other.

Embodiment 1

Referring to FIGS. 1 to 6, this embodiment provides a compression teeth ring connection pipe fitting connecting between two steel pipe bodies 10. The compression teeth ring connection pipe fitting includes a pipe body 100 and a sealing component. The pipe fitting body 100 includes a middle pipe section 110, a first flared section 120 and a second flared section 130, the first flared section 120 and the second flared section 130 are extended along an axis of the pipe fitting body 100 at both ends thereof. A diameter of the first flared section 120 is greater than a diameter of the middle pipe section 110, and a first limit platform 140 is formed at a connection position between the two. The first limit platform 140 is configured to limit an installed steel pipe body 10 in an axial direction. A diameter of the second flared section 130 is greater than the diameter of the first flared section 120, and a second limit platform 150 is formed at a connection position between the two. The sealing component includes a sealing ring 200, a high temperature sealing ring 300, and a teeth ring 400 that are coaxial and sequentially arranged; inner rings of the sealing ring 200, the high temperature sealing ring 300, and the teeth ring 400 form a space for nesting the steel pipe body 10. The second limit platform 150 is configured to limit the sealing ring 200 in an axial direction.

During s specific connection, the steel pipe body 10 is inserted into the pipe fitting body 100, and an insertion end of the steel pipe body 10 abuts against the first limit platform 140. The first limit platform 140 limits the steel pipe body 10 in an axial direction to prevent the steel pipe body 10 from shifting along the axial direction. At the same time, the steel pipe body 10 can be nested in the space formed by the sealing ring 200, the high temperature sealing ring 300, and the teeth ring 400. The second limit platform 150 can limit the sealing ring 200 in an axial direction, which can prevent the sealing ring 200 from shifting along the axial direction. After the aforementioned installation is completed, the second flared section 130 can be tightened with a help of a crimping tool, the second flared section 130 is forced to contract inwardly, so that inner rings of the sealing ring 200, the high temperature sealing ring 300, and the teeth ring 400 are tightly adhered to an outer circumference of the steel pipe body 10. By setting the sealing ring 200, a connection sealing between the steel pipe body 10 and the pipe fitting body 100 can be improved; due to a melting of the sealing ring 200 in a high temperature environment and losing the sealing effect, the high temperature sealing ring 300 is provided on an outer side of the sealing ring 200. The high temperature sealing ring 300 can replace the sealing ring 200 in its sealing function after it loses its sealing effect. In a general design, the high temperature sealing ring 300 meets a certain leakage standard, and a small amount of gas can leak out from this, allowing the high temperature and high pressure inside the pipeline to be released, thereby playing a role in pressure resistance, and avoiding pipeline explosion accidents; at the same time, the setting of the teeth ring 400 can ensure a reliable and stable connection between the steel pipe body 10 and the pipe fitting body 100, and thereby playing a certain tensile and torsional role.

It can be seen that the compression teeth ring connection pipe fitting not only has good connection sealing performance, but also can be suitable for high temperature environments. In high temperature environments, it also has good connection sealing performance and plays a role in preventing leakage. In addition, during a specific installation process, the steel pipe body 10 is inserted into the pipe fitting body 100, and the insertion end of the steel pipe body 10 abuts against to the first limit platform 140. The first limit platform 140 can limit the steel pipe body 10 in the axial direction. At the same time, the steel pipe body 10 is sleeved in the space formed by the sealing ring 200, the high temperature sealing ring 300, and the teeth ring 400, which renders an entire installation process relatively simple and easy to operate.

Figure 2:
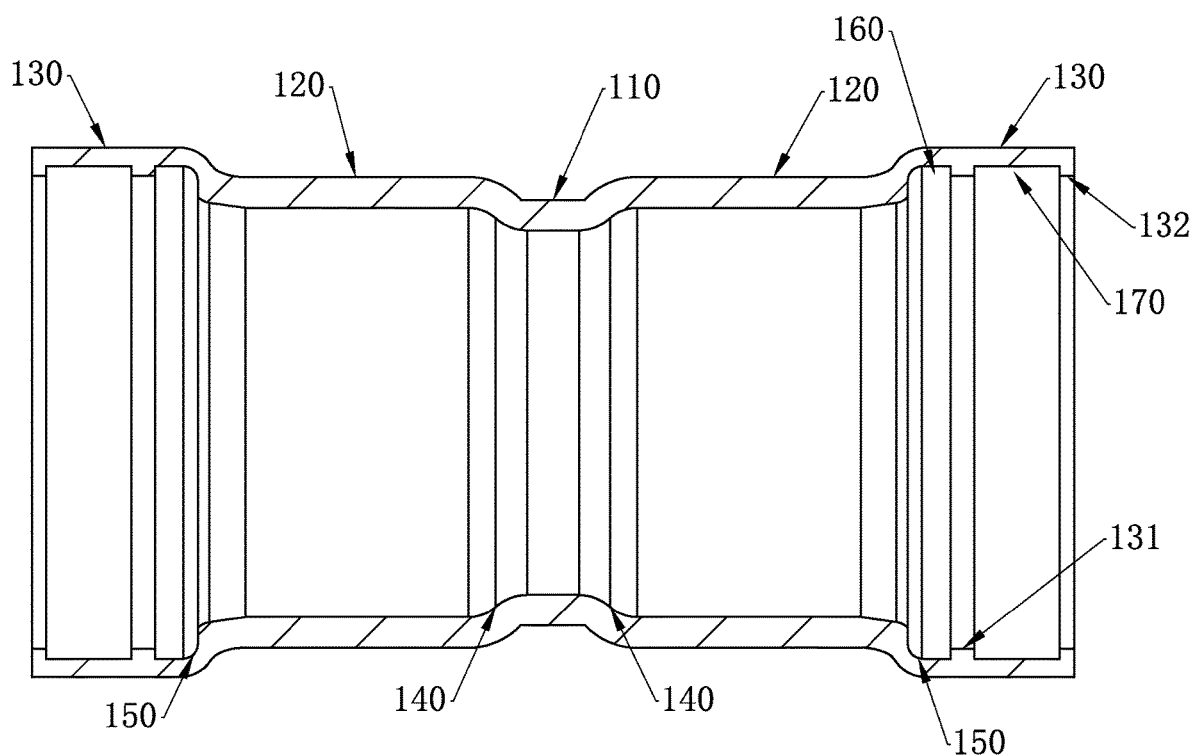
FIG. 2 is a cross-sectional view of a pipe fitting body in Embodiment 1 of the present disclosure.
Figure 3:
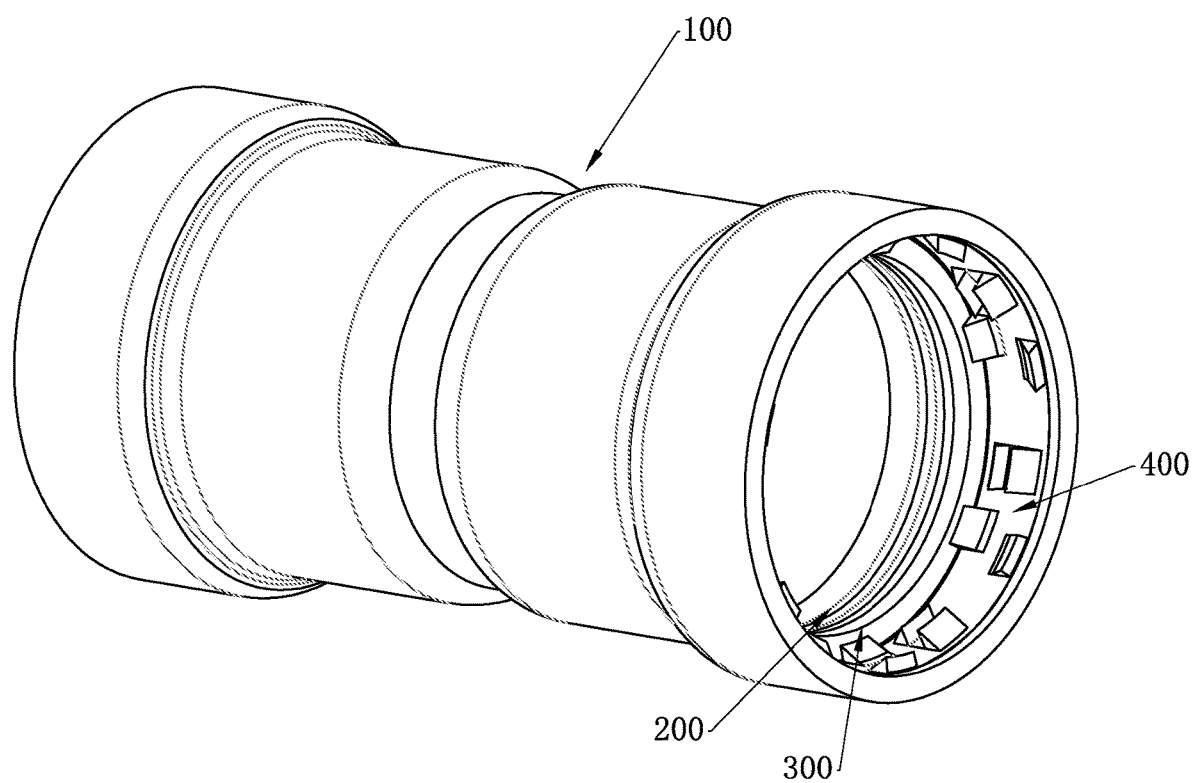
FIG. 3 is a schematic diagram of a connection structure of the compression teeth ring connection pipe fitting in Embodiment 1 of the present disclosure.
Figure 4:
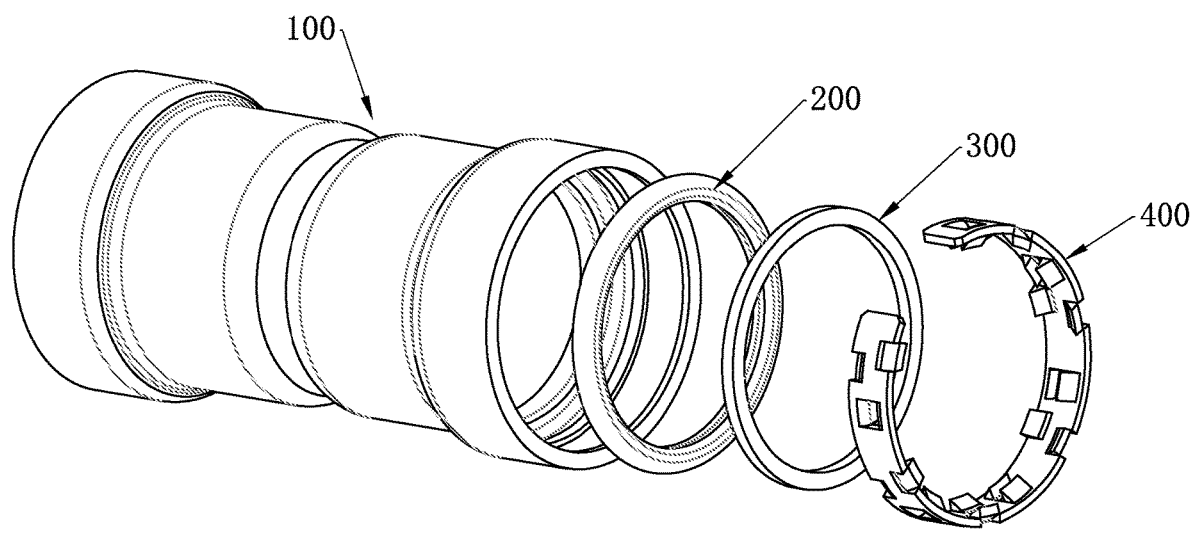
FIG. 4 is a schematic diagram of a disassembly structure of the compression teeth ring connection pipe fitting in Embodiment 1 of the present disclosure.
Figure 5:
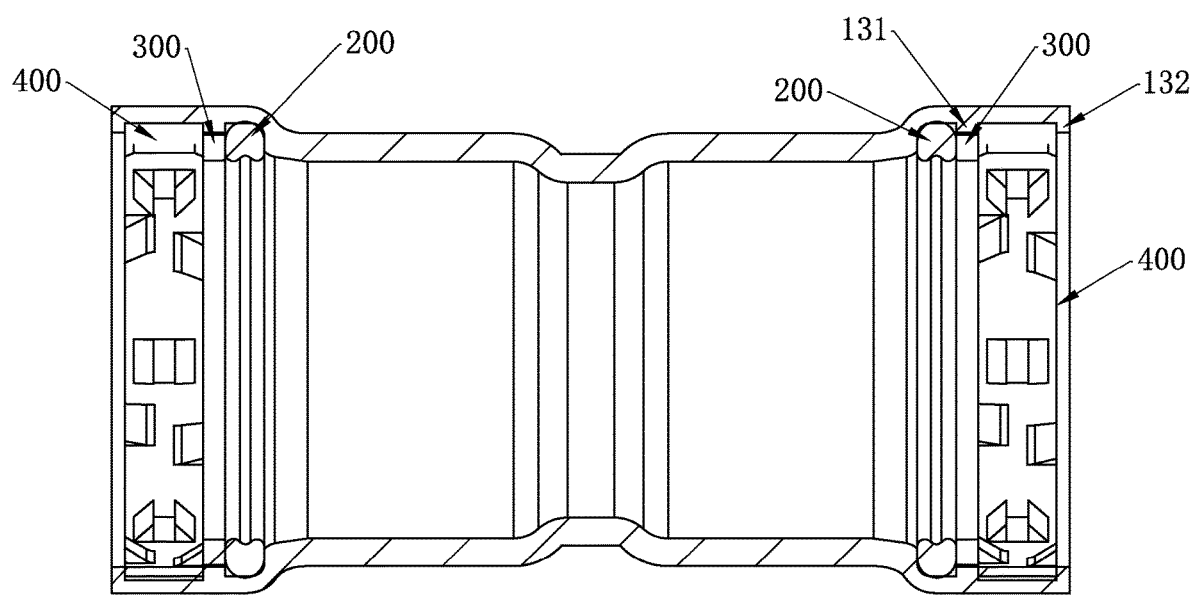
FIG. 5 shows a cross-sectional view of the pipe fitting body shown in FIG. 2 with a sealing ring, a high temperature sealing ring, and a teeth ring installed at both ends of the pipe fitting body.

In one embodiment of the present application, in combination with FIGS. 2 and 5, the second flared section 130 is inwardly formed with a first annular boss 131 in a radial direction; the second flared section 130 has a maximum wall thickness at the first annular boss 131, and a sealing ring limit groove 160 is formed between the first annular boss 131 and the first limit platform 140 to accommodate the sealing ring 200; an inner diameter of the first annular boss 131 is slightly larger than an outer diameter of the high temperature sealing ring 300.

During an installation process, it is necessary to first install the sealing ring 200 at the sealing ring limit groove 160 of the sealing ring, then install the high temperature sealing ring 300 at the first ring boss 131, and finally install the teeth ring 400. By setting the sealing ring limit groove 160, it is convenient for the sealing ring 200 to be installed in place in a timely manner, and at the same time, it can prevent its position deviation after the installation is in place; by setting the first annular boss 131, it is convenient for the high temperature sealing ring 300 to be installed in place in a timely manner; the aforementioned structure is suitable for a thick-walled pipe fitting, and it also has good pressure and impact resistance performances when adopting a design of thick-walled pipe fitting.

Furthermore, further combining FIGS. 2 and 5, a second annular boss 132 is formed inwardly at an edge of a socket of the second flared section 130 in the radial direction; a teeth ring limit groove 170 is formed between the first annular boss 131 and the second annular boss 132 to accommodate the teeth ring 400. This arrangement facilitates a timely installation of the teeth ring 400 and prevents its position deviation after installation.

Figure 6:
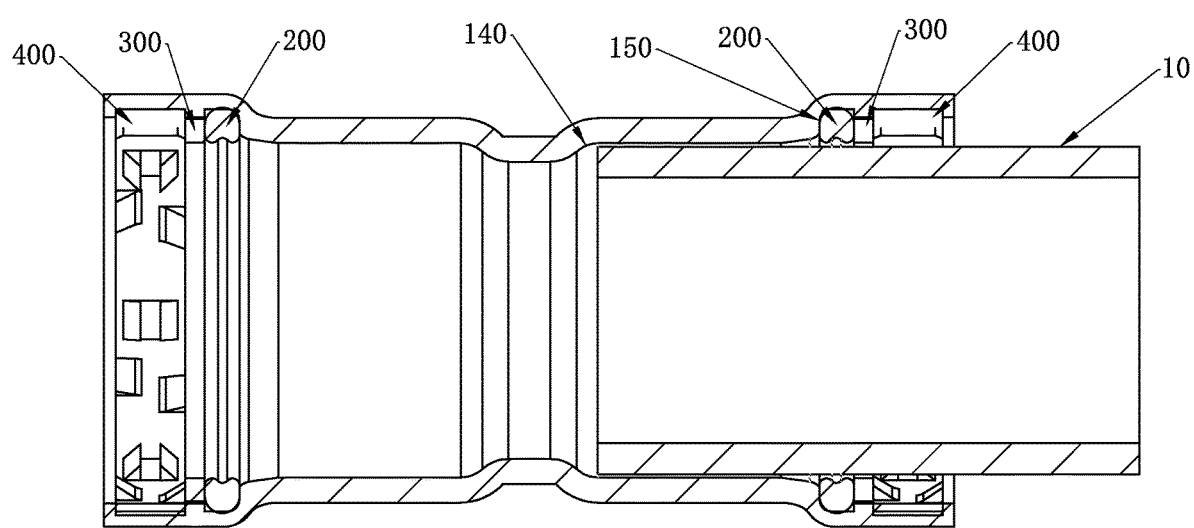
FIG. 6 is a cross-sectional view of a steel pipe body inserted at one end of the pipe fitting body on the basis of FIG. 5 before crimping.

During the specific installation process, the sealing ring 200, high temperature sealing ring 300, and teeth ring 400 are installed in sequence as shown in FIG. 5, and then the steel pipe body 10 is inserted into the pipe fitting body 100 as shown in FIG. 6, and the insertion end of the pipe fitting body 100 abuts against the first limit platform 140.

Figure 7:
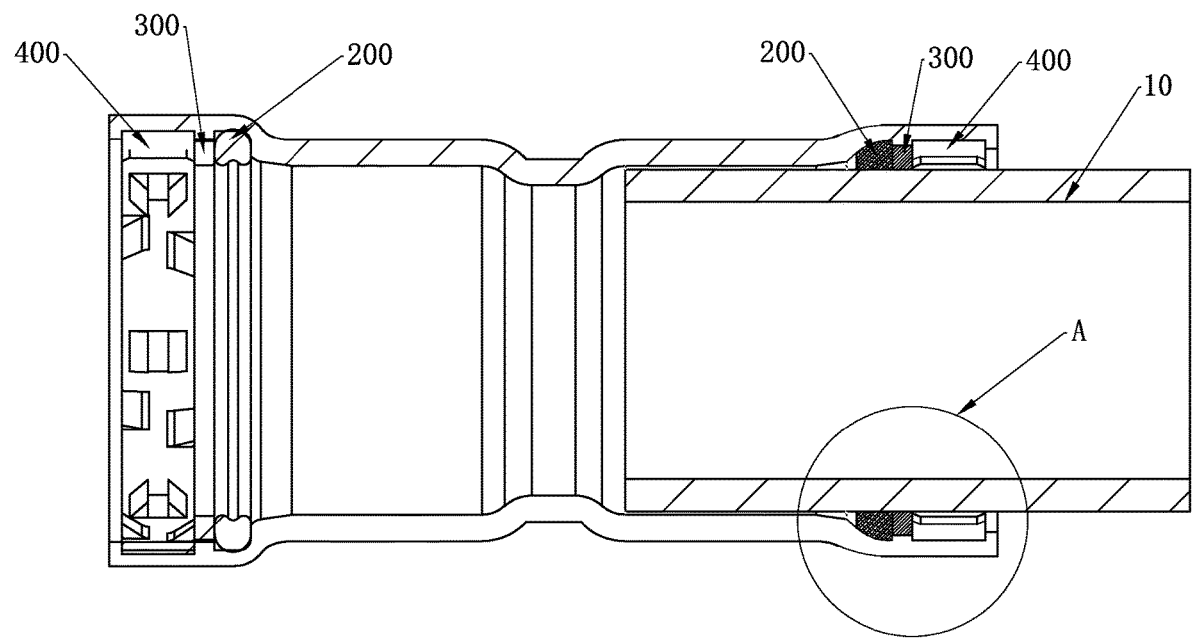
FIG. 7 is a cross-sectional view of the steel pipe body inserted at one end of the pipe fitting body on the basis of FIG. 5 after crimping.
Figure 8:
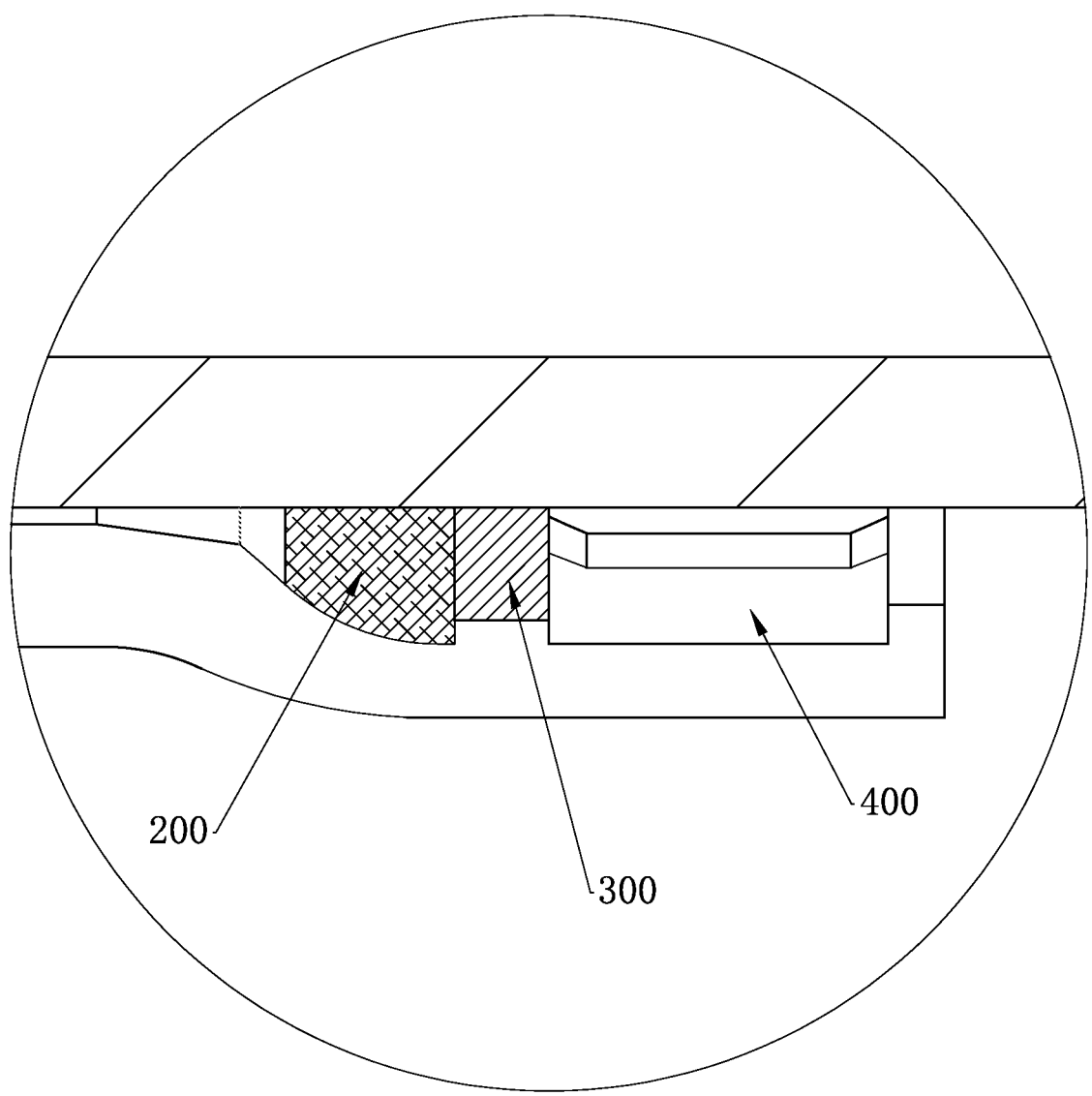
FIG. 8 is a partially enlarged schematic diagram of A in FIG. 7.

Based on FIGS. 7 and 8, after all of the above are installed in place, the second flared section 130 is pressed inwardly using a crimping tool, which causes the second flared section 130 to collapse, thereby squeezing the sealing ring 200, the high temperature sealing ring 300, and the teeth ring 400, which renders them tightly adhere between the steel pipe body 10 and the second flared section 130 to ensure sealing and stability. The compression teeth ring connection pipe fitting in this embodiment uses a crimping tool to crimp and deform the pipe fitting body 100, thereby instantly completing the connection between the pipe fitting body 100 and the steel pipe body 10. The crimping tool crimps the second flared section 130 of the pipe fitting, and the sealing ring 200, the high temperature sealing ring 300, and the teeth ring 400 are installed on an inner side of the second flared section 130. All three are compressed at the same time, the sealing ring 200 and high temperature sealing ring 300 inside the second flared section 130 are forced to tightly adhere to the steel pipe body 10; and thus, it has a sealing and sealing effect, and the teeth ring 400 shrinks and firmly fastens the steel pipe body 10, and thereby providing good connection, tensile and torsional resistance.

The thick-walled pipe fittings are made of carbon steel as the base material, which has a lower cost compared to stainless steel or copper pipe fitting. A surface of the pipe fitting can be processed with zinc plating and EP (Epoxy cover) anti-corrosion, and its service life is longer compared to ordinary galvanized materials.

Figure 9:
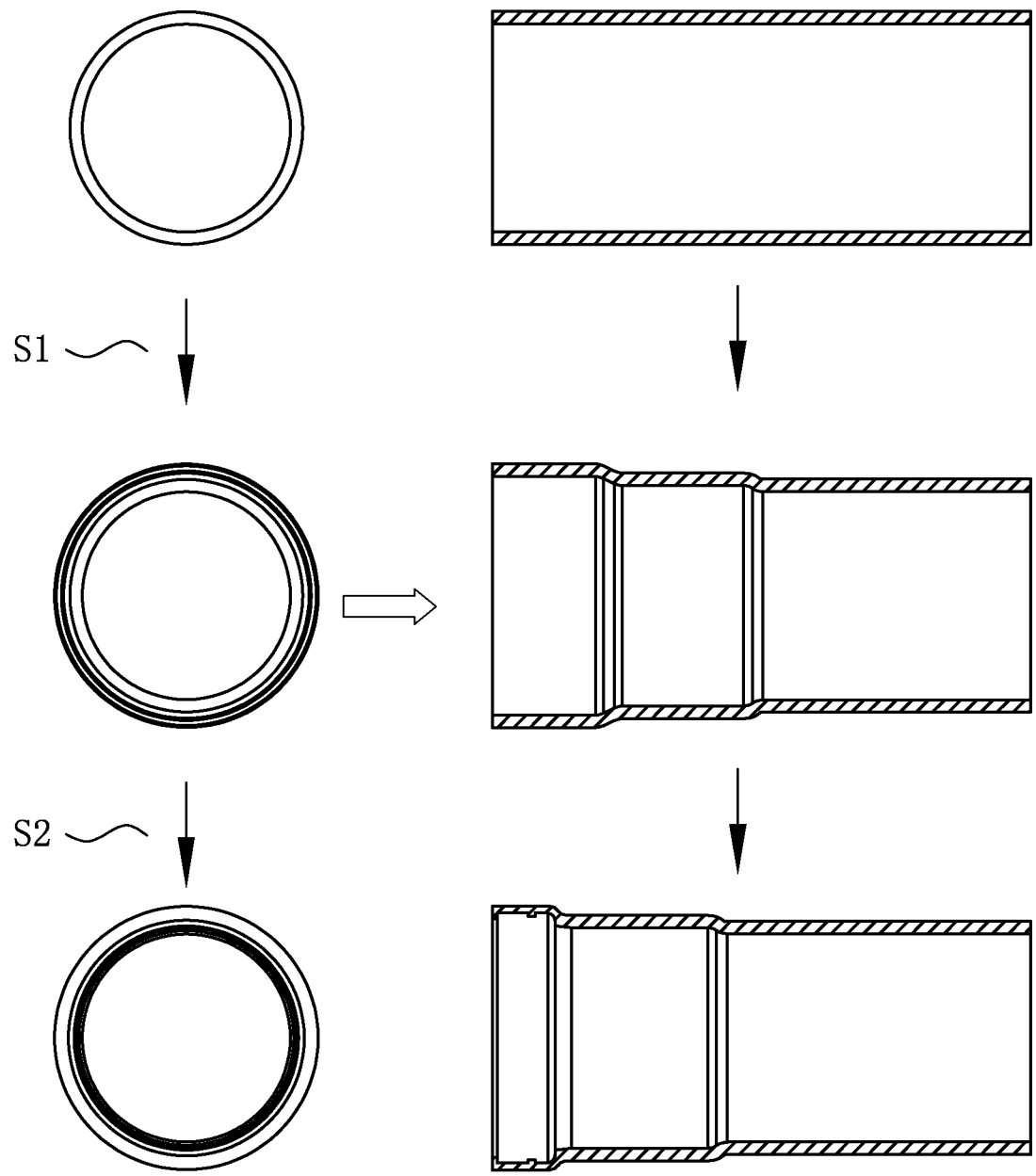
FIG. 9 is a schematic diagram of a processing process of the pipe fitting body in Embodiment 1 of the present disclosure.

Referring to FIG. 9, a processing method of the pipe fitting body 100 includes the following steps:

S1, flaring one end of the pipe fitting body 100 using a flaring device to form a first flared section 120, and then flaring again using the flaring device on the first flared section 120 to form a second flared section 130;

S2, processing a first annular boss and a second annular boss 132 in the second flared section 130.

In this embodiment, the high temperature sealing ring 300 can adopt the following structural forms. In a practical application, different structural forms or sizes of high temperature sealing ring 300 can be selected according to needs.

Figure 10:
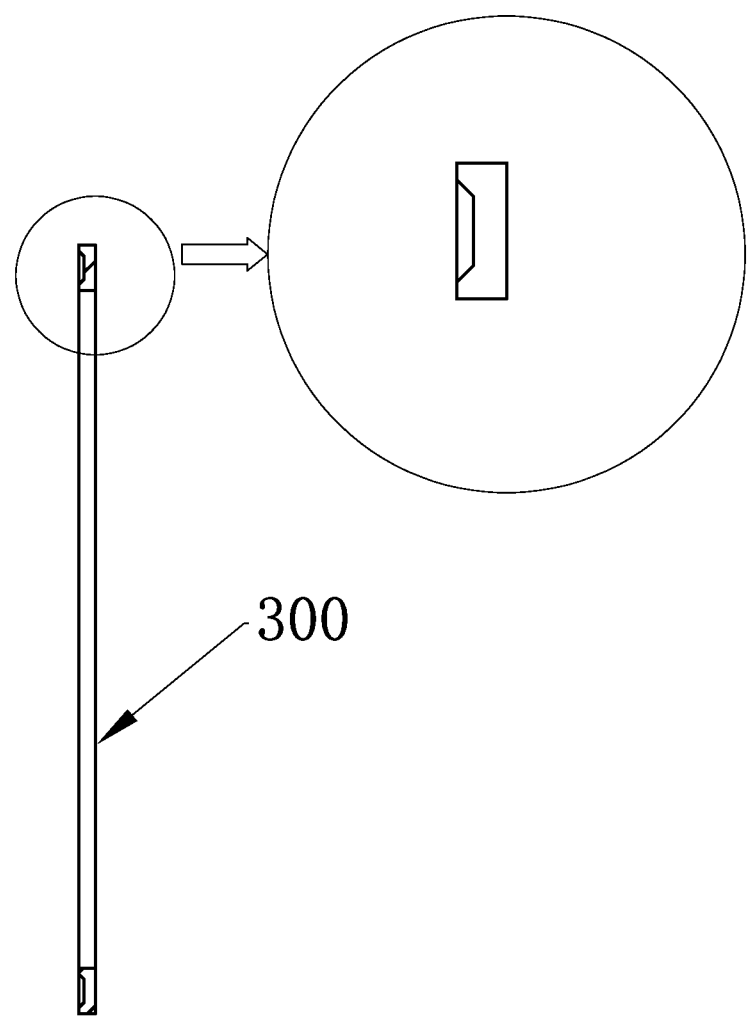
FIG. 10 is a first structural schematic diagram of the high temperature sealing ring.
Figure 11:
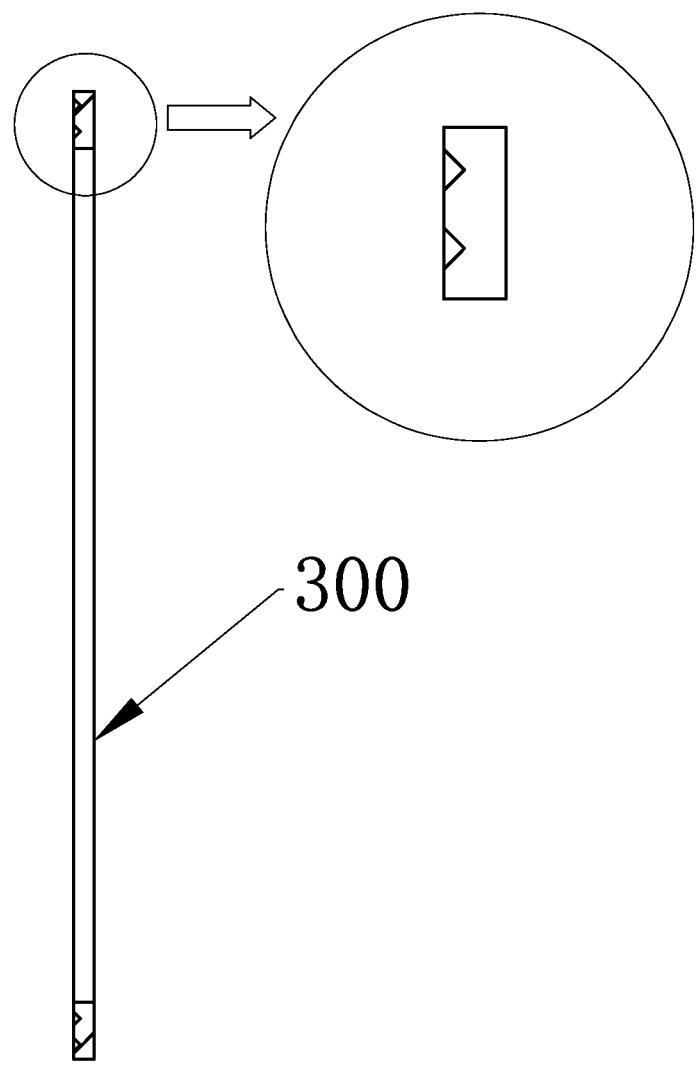
FIG. 11 is a second structural schematic diagram of the high temperature sealing ring.

Referring to FIGS. 10 and 11, one side of the high temperature sealing ring 300 is recessed inwardly to form a groove.

Furthermore, an opening of the groove gradually increases from an inside to an outside.

For example, a cross-sectional shape of the groove is trapezoidal or triangular, and of course, it can also be other shapes, which will not be listed here.

Figure 12:
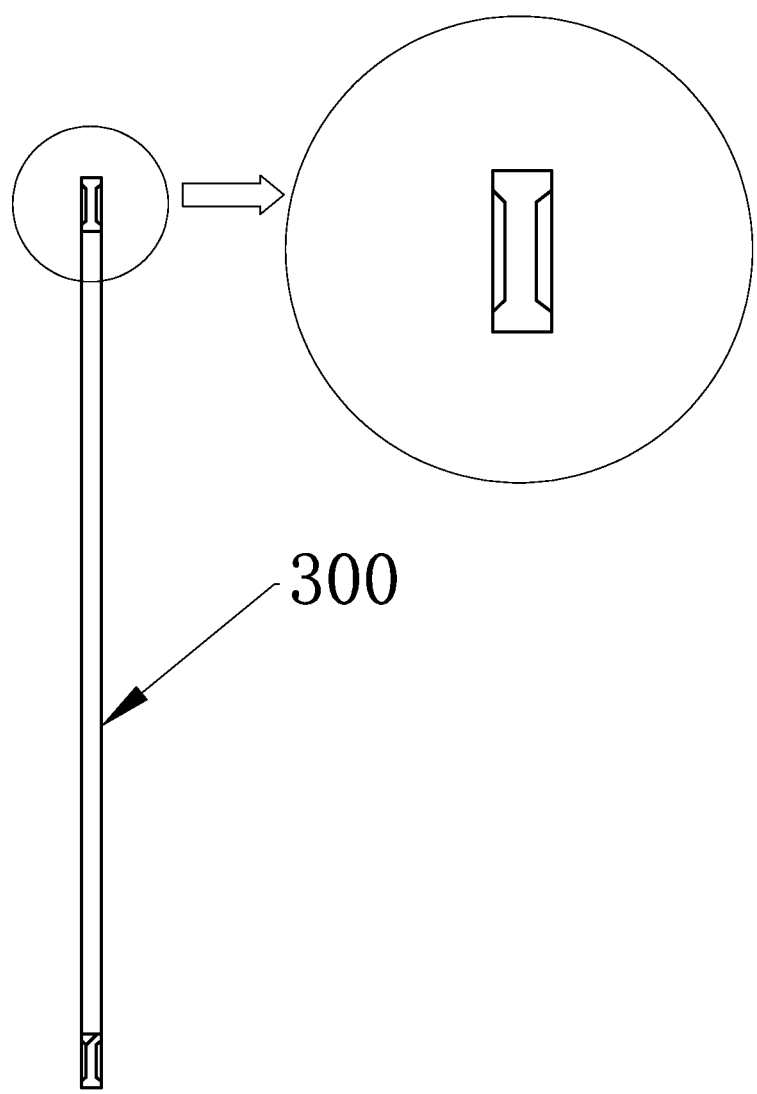
FIG. 12 is a third structural schematic diagram of the high temperature sealing ring.

In other embodiments, referring to FIG. 12, both ends of the high temperature sealing ring 300 are recessed inwardly to form a groove, and a cross-sectional shape of the grooves is trapezoidal.

Figure 13:
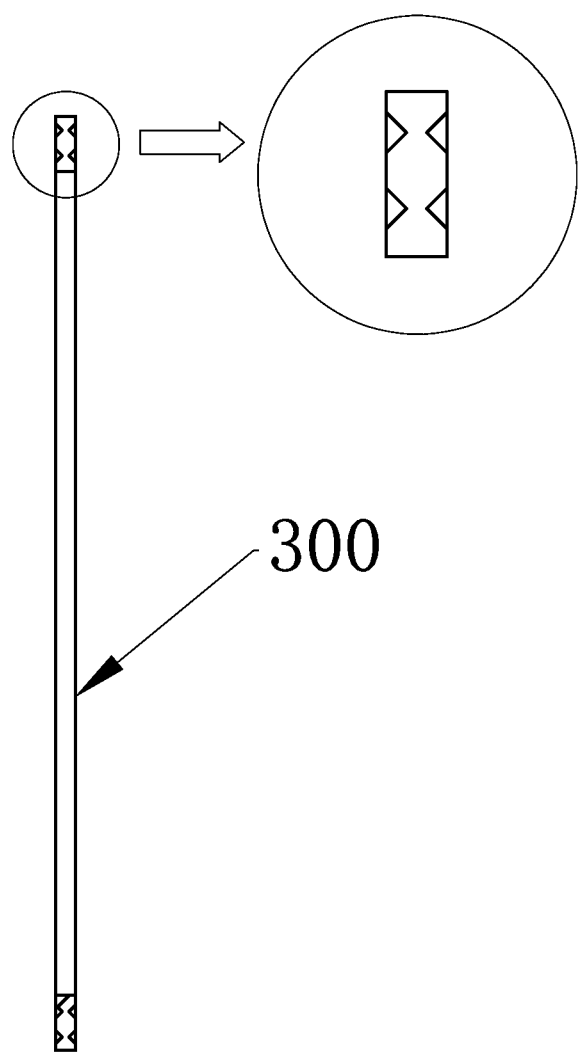
FIG. 13 is a fourth structural schematic diagram of the high temperature sealing ring.

Referring to FIG. 13, both sides of the high temperature sealing ring 300 are recessed inwardly to form two grooves, which are spaced radially along the high temperature sealing ring 300; for example, the cross-sectional shape of the groove is triangular.

Figure 14:
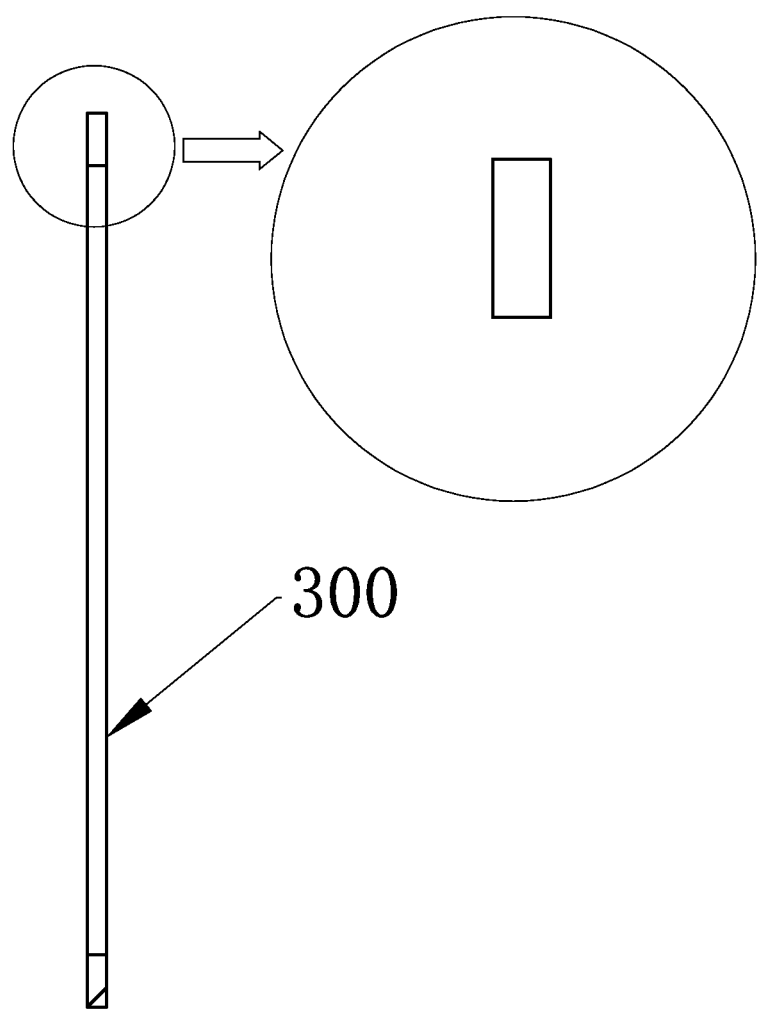
FIG. 14 is a fifth structural schematic diagram of the high temperature sealing ring.

Referring to FIG. 14, both end surfaces of the high temperature sealing ring 300 are planer surface and the high temperature sealing ring 300 has a same wall-thickness at each point.

In this embodiment, a material of the high temperature sealing ring 300 is not limited to stainless steel, copper, or graphite, but it can also be other high temperature resistant materials, which will not be listed here.

On the basis of the above embodiments, referring to FIGS. 15 to 23, the teeth ring 400 includes a teeth ring body 410 and an inner ring protruding from the teeth ring body 410; and the inner ring is a toothed shaped structure. The teeth ring body 410 is in an open ring structure; the toothed structure is configured to insert into the steel pipe body 10 when it is compressed with the steel pipe body 10 so as to form a tight and reliable connection structure between the two, thereby effectively preventing the steel pipe body 10 from detaching from the pipe fitting body 100.

It should be noted that as long as the toothed shaped structure can be inserted into the steel pipe body 10 during a mutual compression with the steel pipe body 10, all structural forms are within the protection scope of the present disclosure.

In a specific implementation, the teeth ring body 410 is in a "C" shaped structure and is made of a radially shrinkable metal material, so that when the teeth ring body 410 is compressed by a crimping tool on the second flared section 130 of the pipe fitting body 100, it can shrink inwardly and hold the steel pipe body 10.

In this embodiment, the teeth ring 400 can adopt the following structural form.

The toothed structure includes multiple teeth 420 spaced along an extension direction of the teeth ring body 410. The teeth 420 are extended from the inner ring of the teeth ring body 410 towards its own axis direction. Of course, the form of teeth 420 extending slightly from the inner ring of the teeth ring body 410 to its own axis direction is also within the protection scope of the present disclosure.

Figure 15:
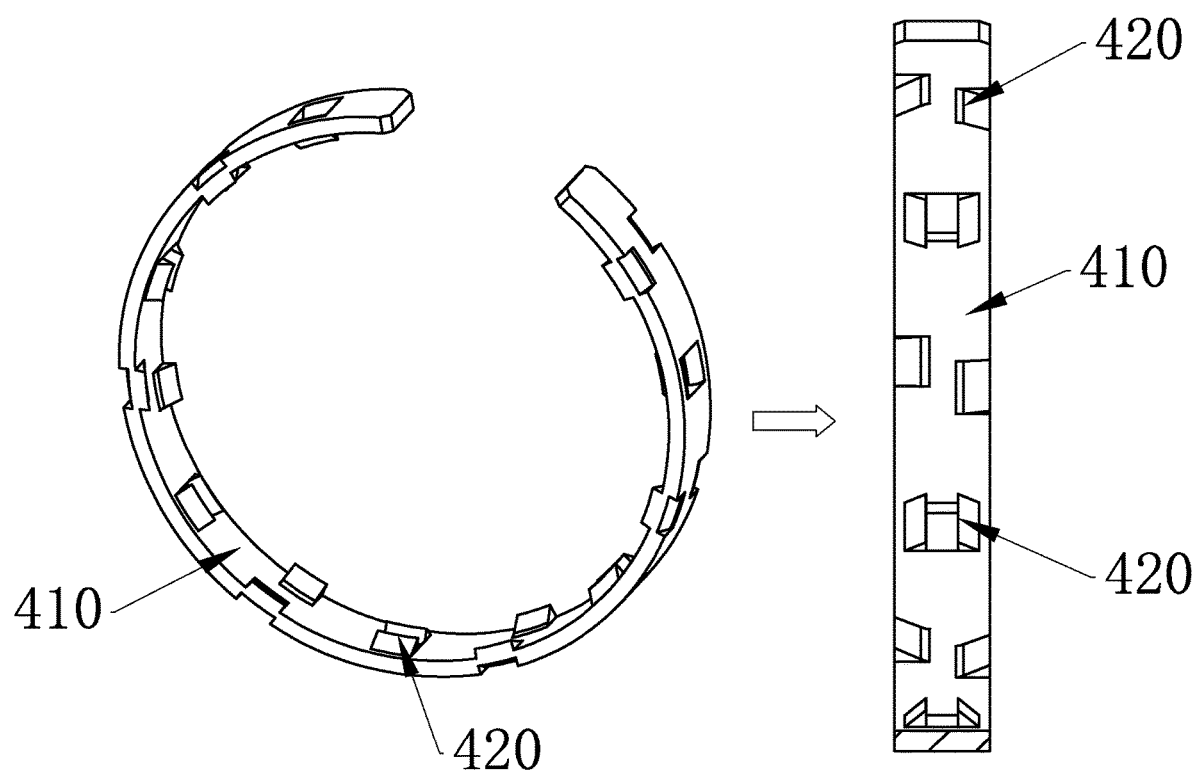
FIG. 15 is a first structural schematic diagram of the teeth ring.

Referring to FIG. 15, the toothed structure is two rows, some teeth 420 are faced with each other and some teeth 420 are misaligned with each other.

Figure 16:
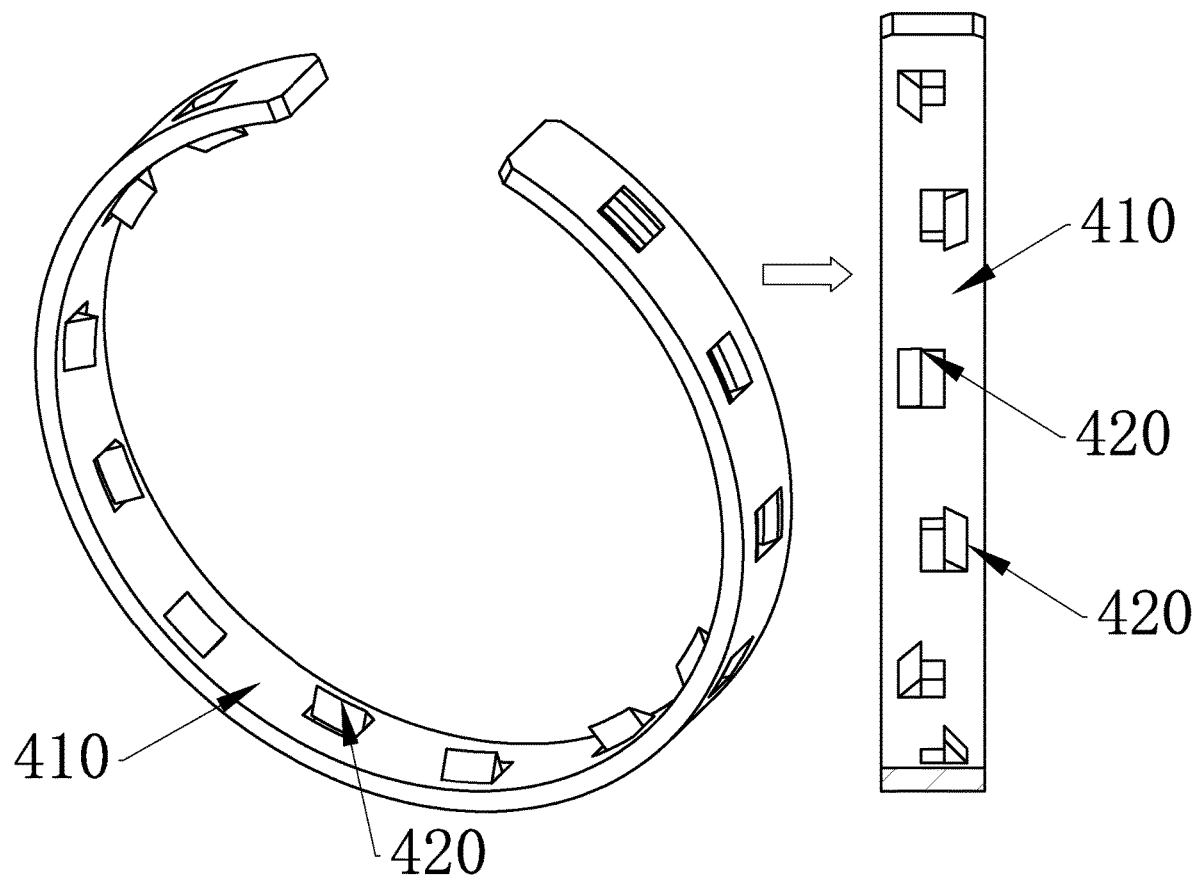
FIG. 16 is a second structural schematic diagram of the teeth ring.
Figure 17:
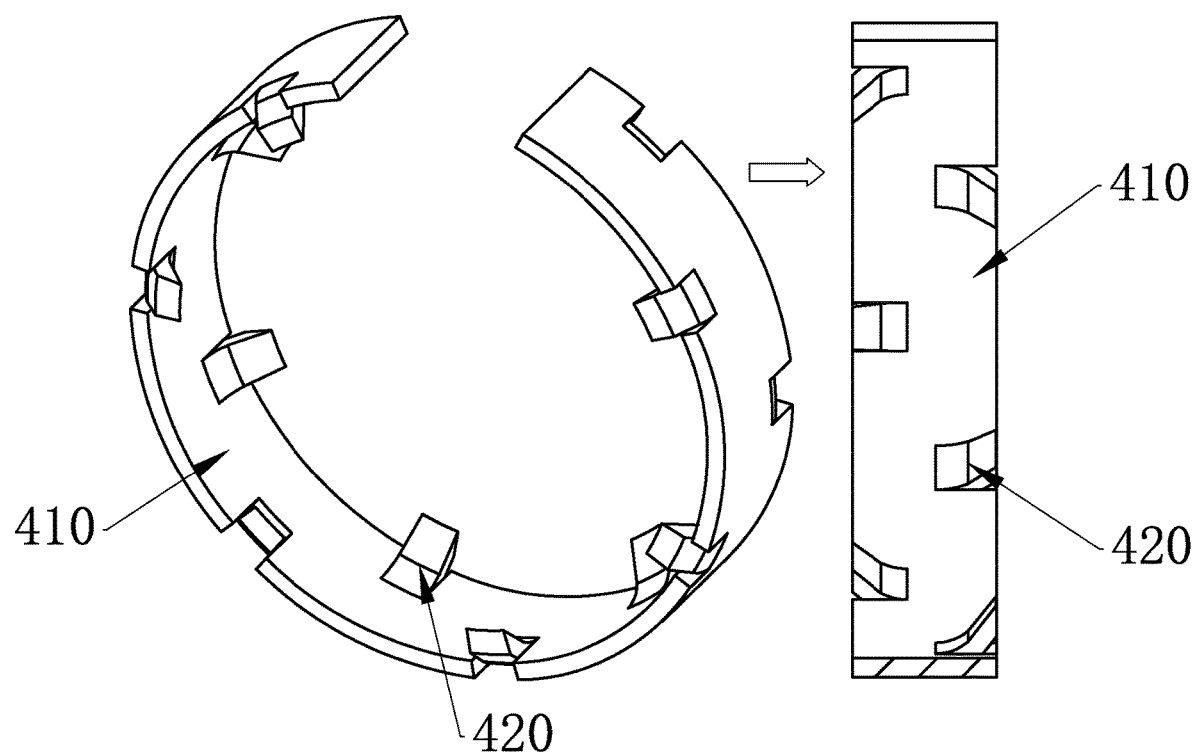
FIG. 17 is a third structural schematic diagram of the teeth ring.

Referring to FIGS. 16 and 17, the toothed structure is arranged in two rows, some teeth 420 of one row of the toothed structure are misaligned relative to the teeth 420 of the other row of the toothed structure. Where, the structure and setting position of the teeth 420 in FIG. 16 and FIG. 17 are slightly different.

Figure 18:
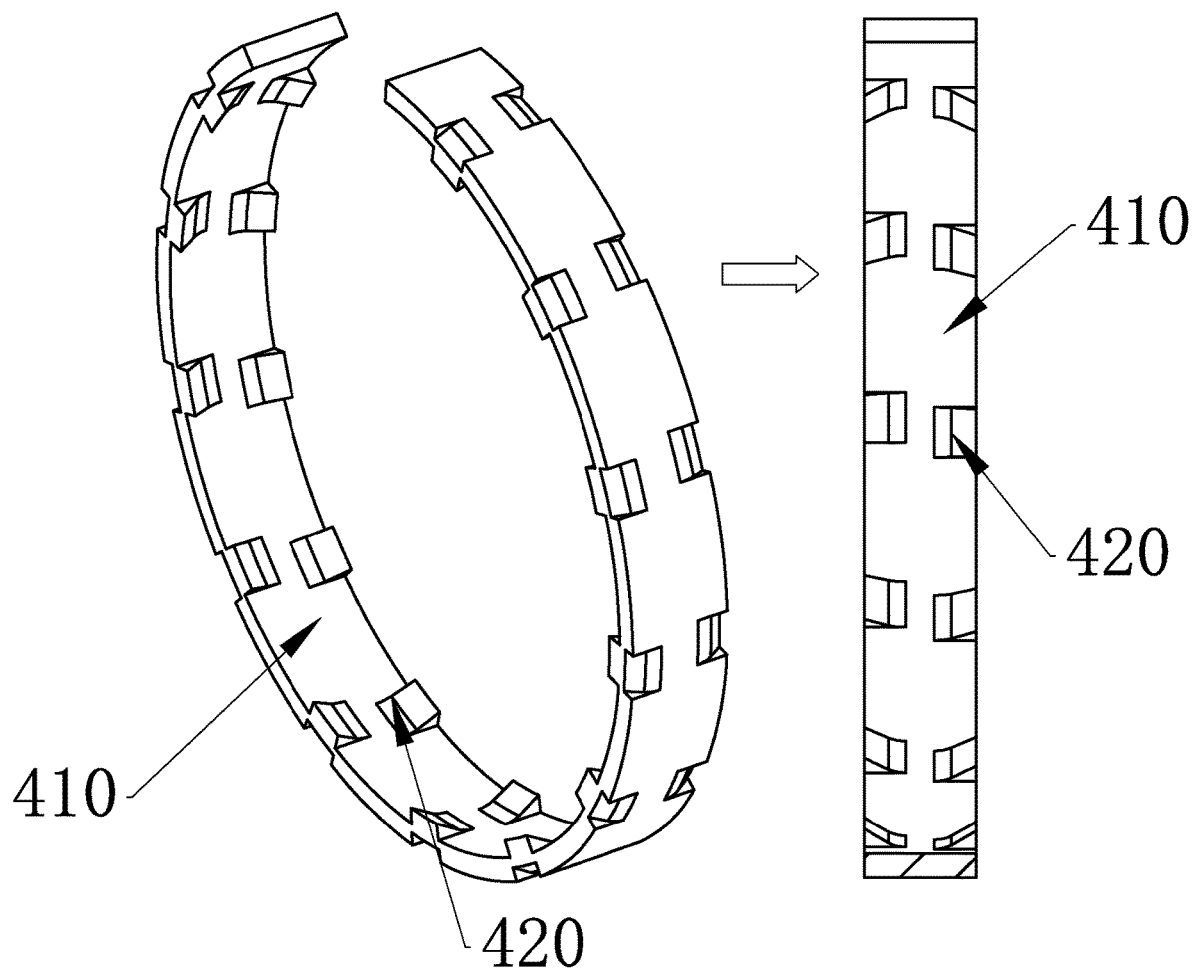
FIG. 18 is a fourth structural schematic diagram of the teeth ring.
Figure 19:
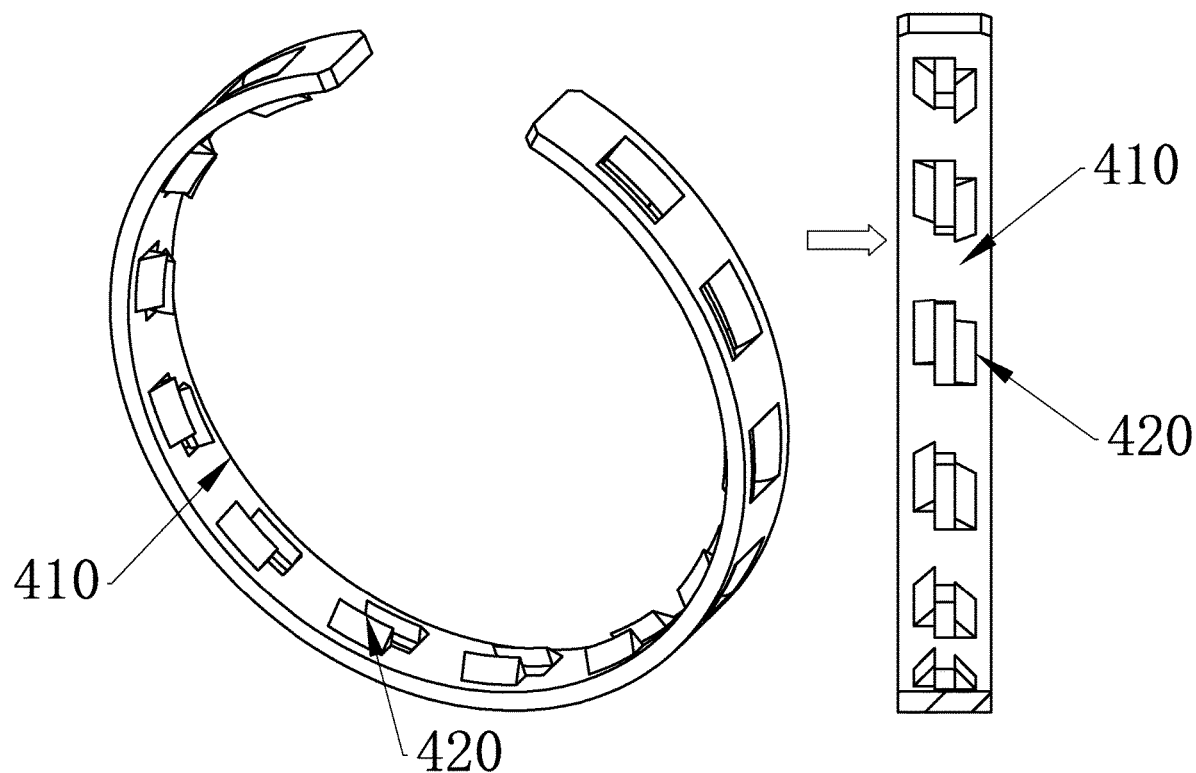
FIG. 19 is a fifth structural schematic diagram of the teeth ring.

Referring to FIGS. 18 and 19, the toothed structure is set in two rows, where the teeth 420 of one row of the toothed structure are offset by a certain distance from the teeth 420 of the other row of the toothed structure.

Figure 20:
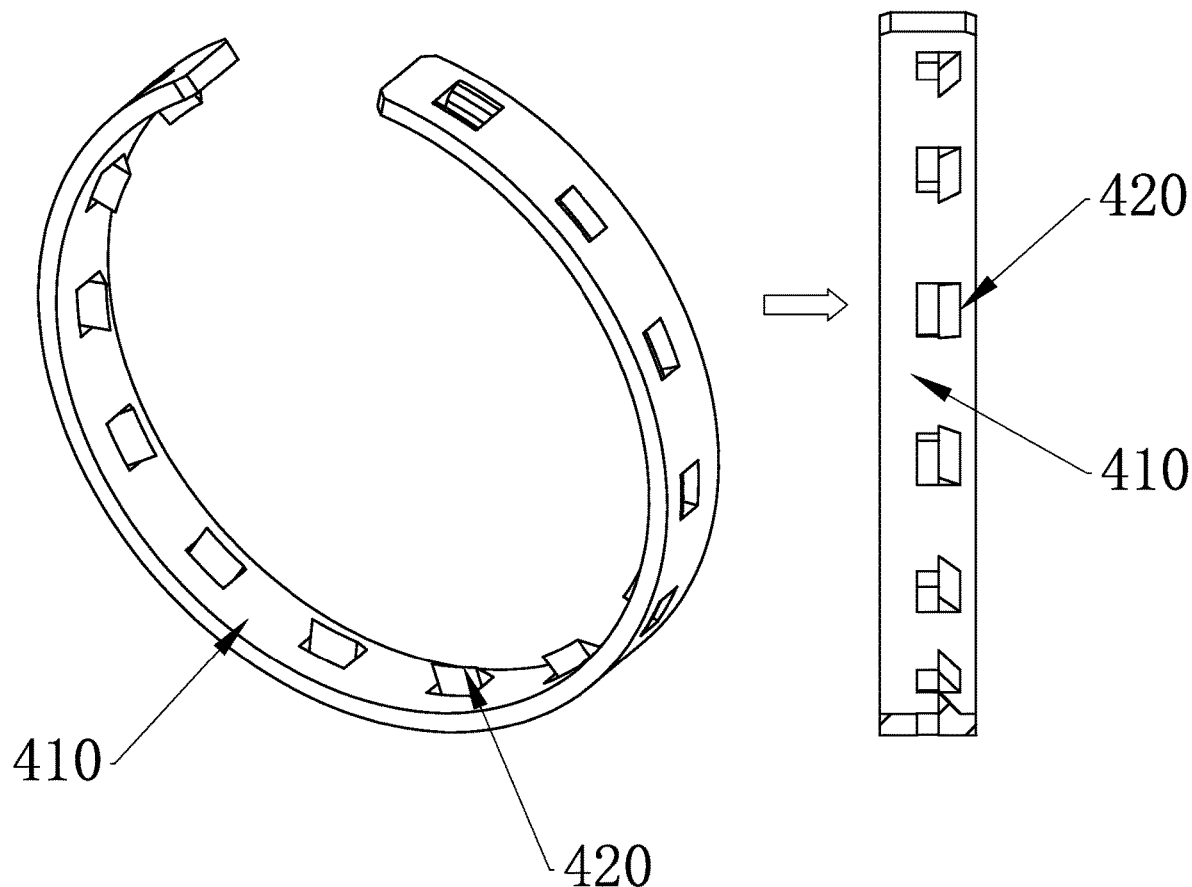
FIG. 20 is a sixth structural schematic diagram of the teeth ring.

Referring to FIG. 20, the toothed structure is arranged in a row along the extension direction of the teeth ring body 410.

Figure 21:
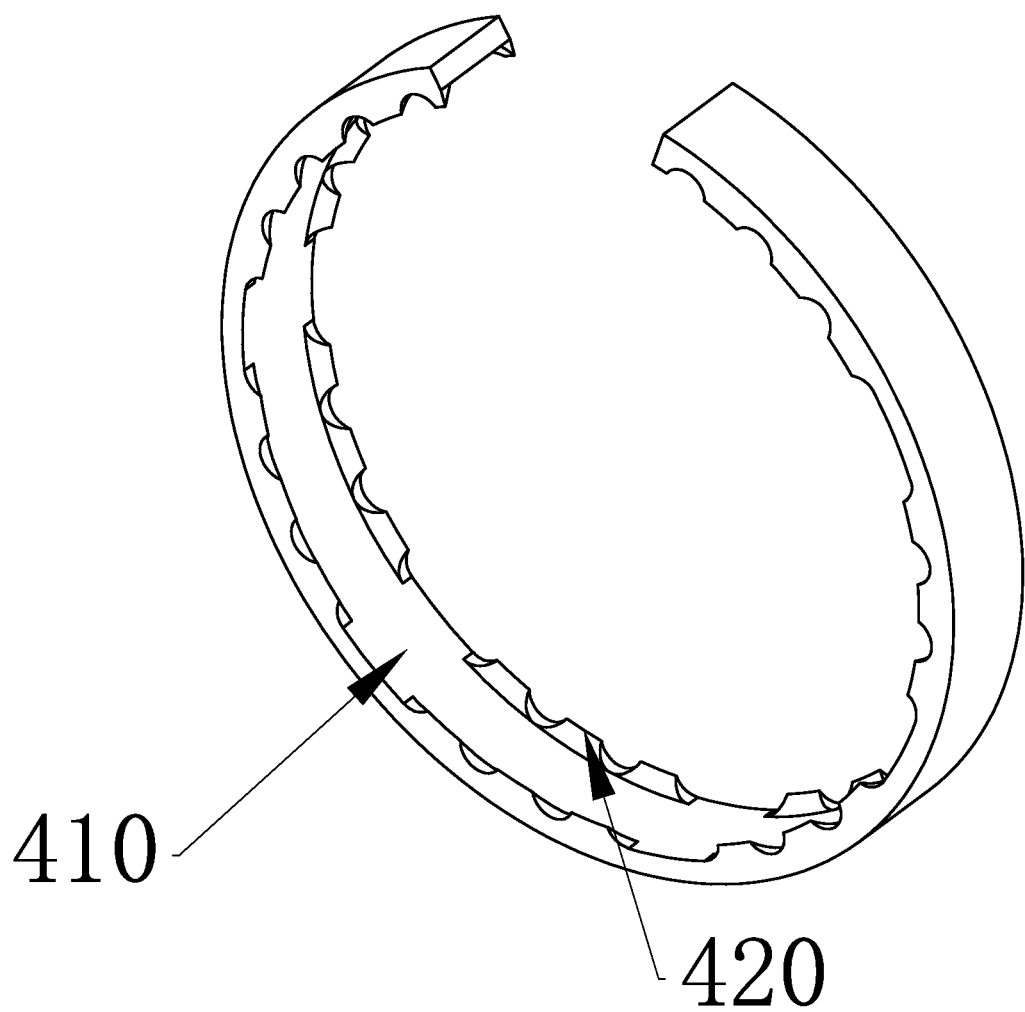
FIG. 21 is a seventh structural schematic diagram of the teeth ring.
Figure 22:
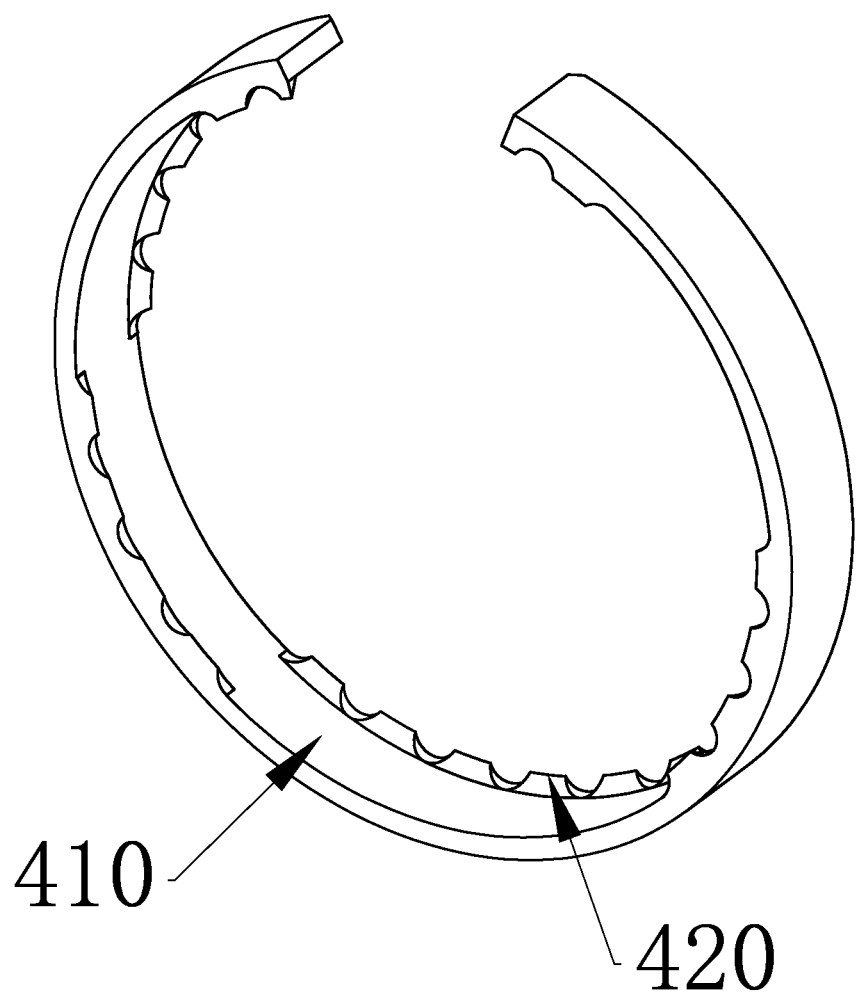
FIG. 22 is an eighth structural schematic diagram of the teeth ring.

Referring to FIGS. 21 and 22, the toothed structure is arranged at an edge of both sides of the teeth ring body 410.

Figure 23:
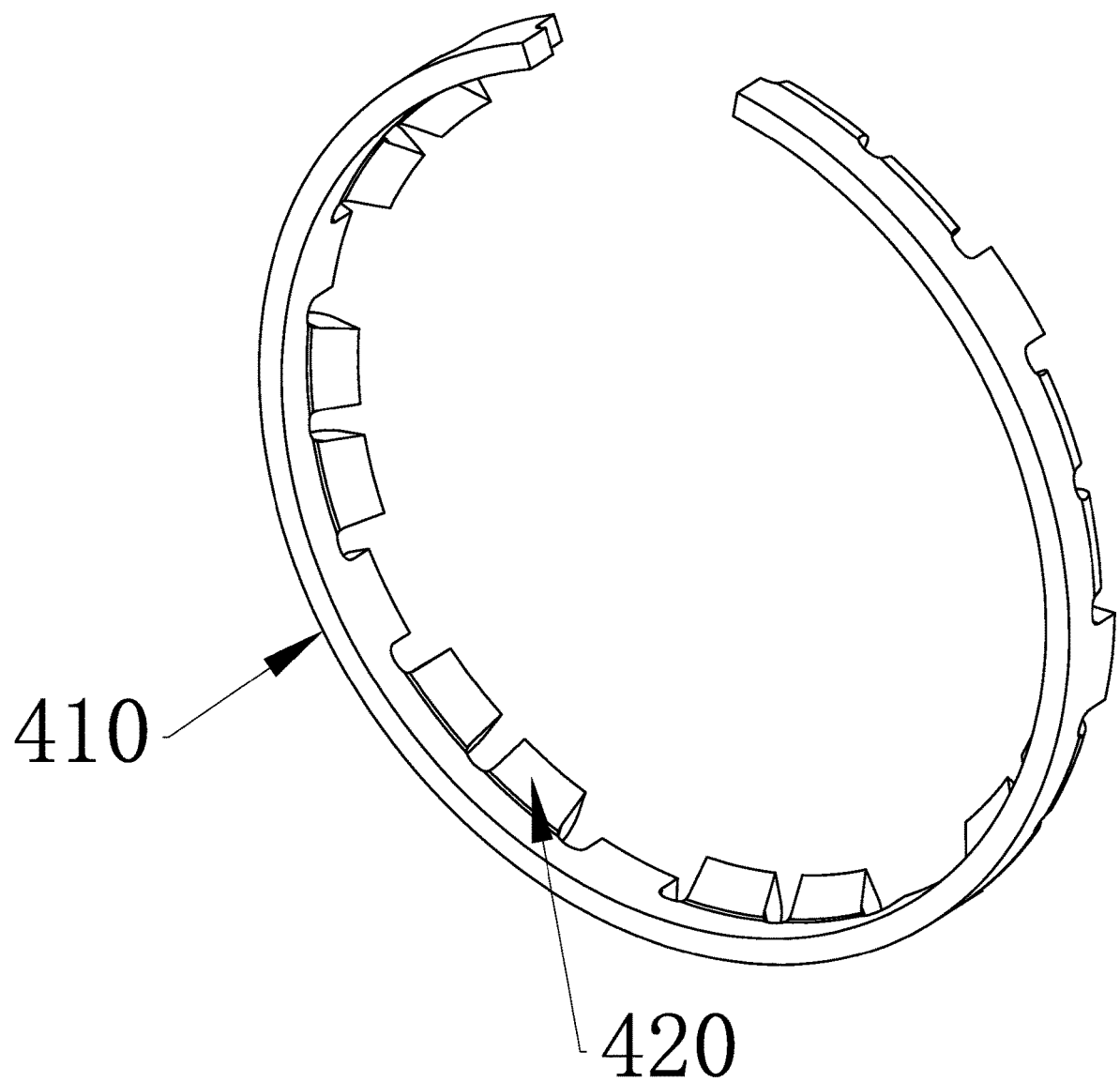
FIG. 23 is a ninth structural schematic diagram of the teeth ring.

Referring to FIG. 23, the toothed structure is located at the edge of one side of the teeth ring body 410.

When the second flared section 130 is recessed inwardly through a crimping tool, it can cause the second flared section 130 to collapse, thereby squeezing the sealing ring 200, the high temperature sealing ring 300, and the teeth ring 400. While squeezing the teeth ring 400, the teeth ring 420 can be inserted into the steel pipe body 10, which forms a tighter and more reliable connection between the two, and plays a good tensile and torsional role.

Embodiment 2

Figure 24:
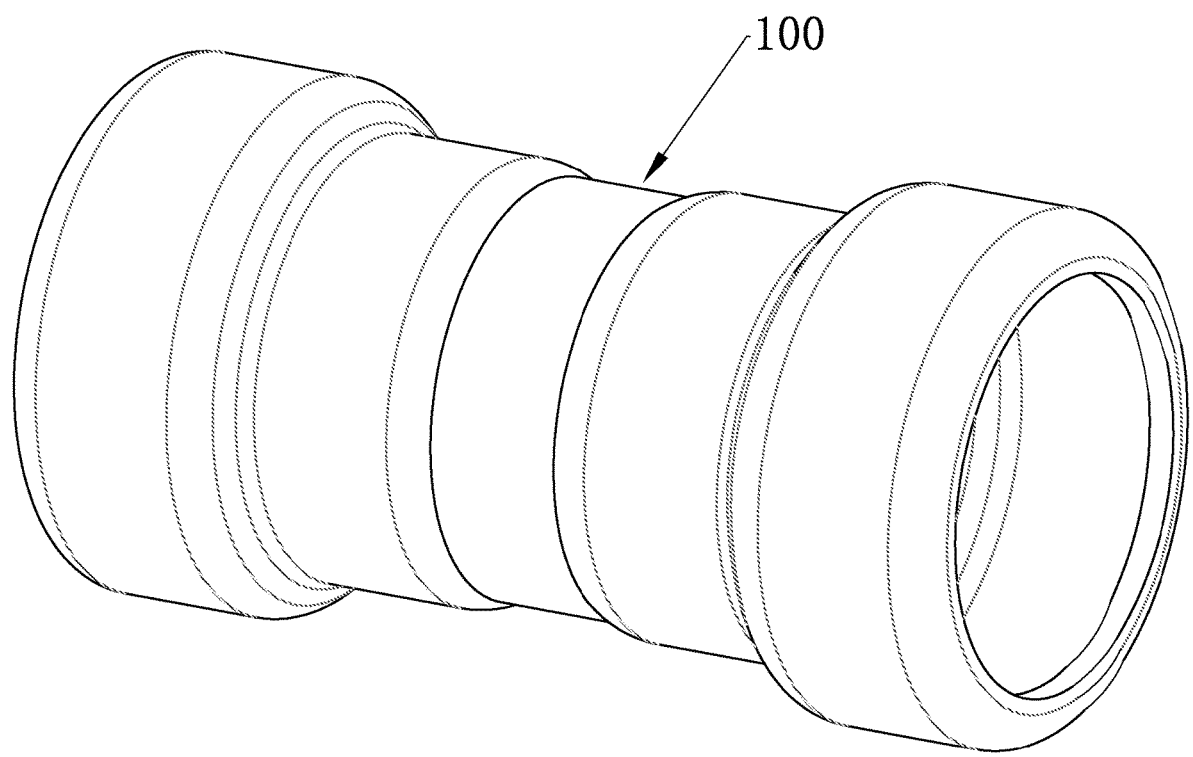
FIG. 24 is a structural schematic diagram of the pipe fitting body in Embodiment 2 of the present disclosure.
Figure 25:
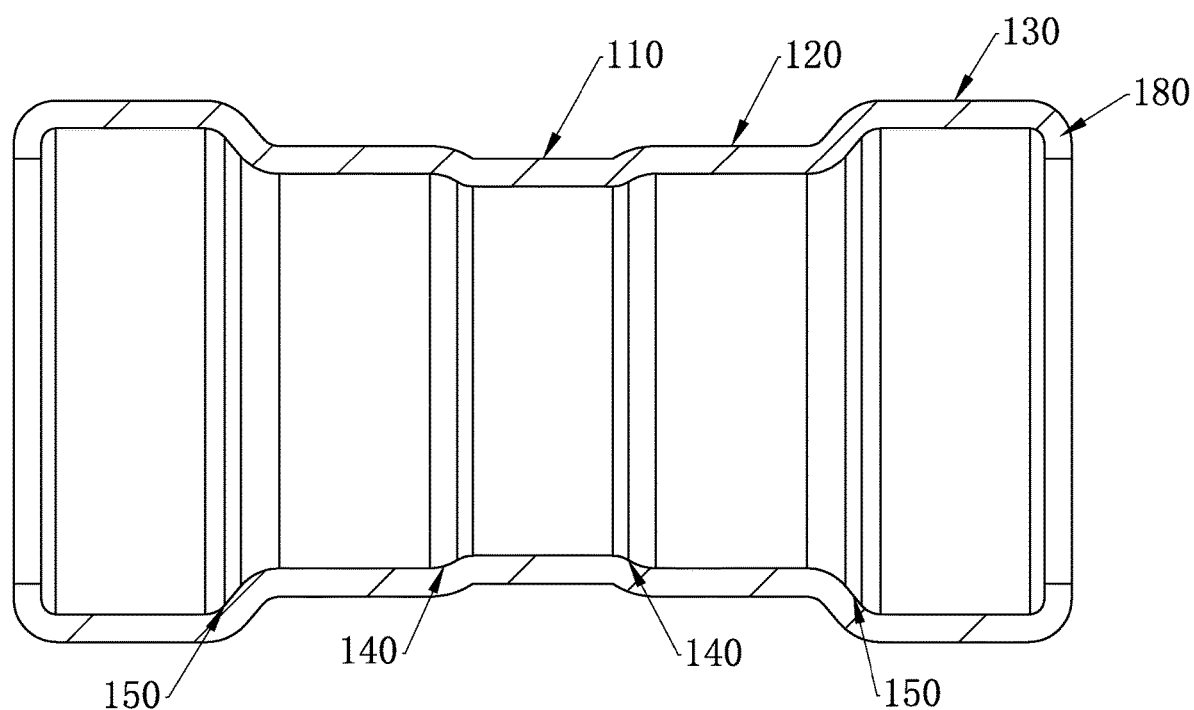
FIG. 25 is a cross-sectional view of the pipe fitting body in Embodiment 2 of the present disclosure.

Referring to FIGS. 24 and 25, this embodiment also provides a compression teeth ring connection pipe fitting. The difference from Embodiment 1 is that the first annular boss 131 is not provided, and an edge of the socket of the second flared section 130 gradually retracts inwardly to form a smooth transition of a shrinkage section 180. A diameter of the shrinkage section 180 is smaller than an outer diameter of the teeth ring 400. This structure is suitable for a thin-walled pipe fitting having a wall thickness between 1.5 mm and 3 mm compared to a thick-walled pipe fitting. Its connection performance is consistent with that of the thick-walled pipe fitting (connection performance is not limited to tensile, torsional, seismic, bending, etc.), and which reduced material costs. Due to the wall thickness ranging from 1.5 mm to 3 mm, it can be hydraulically formed in one go without the need for mechanical processing, and reduces process costs.

Figure 26:
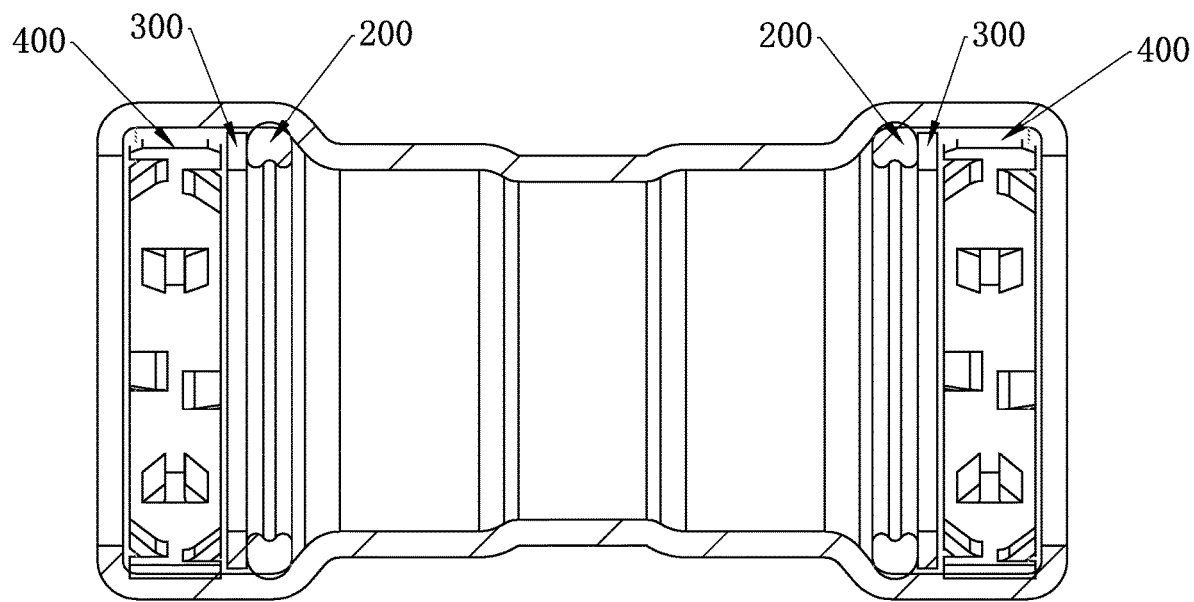
FIG. 26 shows a cross-sectional view of the pipe fitting body shown in FIG. 25 with the sealing ring, the high temperature sealing ring, and the teeth ring installed at both ends thereof.

Referring to FIG. 26, the sealing ring 200, the high temperature sealing ring 300, and the teeth ring 400 are sequentially connected between the second limit platform 150 and the shrinkage section 180.

Figure 27:
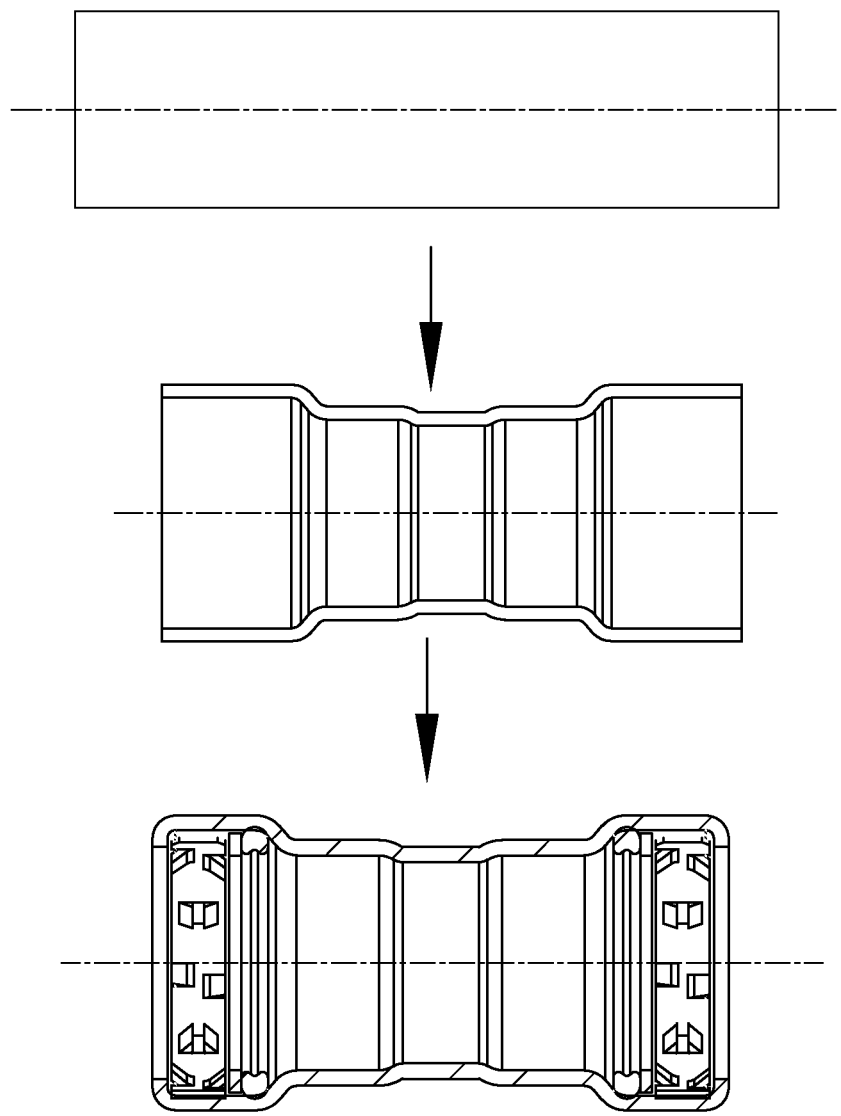
FIG. 27 is a schematic diagram of a processing and an installation of the compression teeth ring connection pipe fitting in Embodiment 2 of the present disclosure.

Referring to FIG. 27, a processing and assembly method for the compression teeth ring connection pipe fitting includes the following steps:
  flaring the two ends of the pipe fitting body 100 using a flared device to form the first flared section 120, and then flaring again using the flared device on the first flared section 120 to form the second flared section 130;
  connecting the sealing ring 200, the high temperature sealing ring 300, and the teeth ring 400 in sequence between the second limit platform 150 corresponding to the second flared section 130 and the shrinking section 180.

Finally, it should be noted that the above embodiments are only used to illustrate the technical solution of the present disclosure and not to limit it; although the present disclosure has been described in detail with reference to the aforementioned embodiments, ordinary technical personnel in this field should understand that they can still modify the technical solutions recorded in the aforementioned embodiments, or equivalently replace some or all of the technical features; and these modifications or substitutions do not make the essence of the corresponding technical solutions deviate from the scope of the various embodiments of the present disclosure.

What is claimed is:

1. A compression teeth ring connection pipe fitting connecting between two steel pipe bodies, wherein the compression teeth ring connection pipe fitting comprises a pipe fitting body and a sealing component;
  the pipe fitting body comprises a middle pipe section, a first flared section, and a second flared section; the first flared section and the second flared section are extended along an axis of the pipe fitting body at two ends thereof;
  a diameter of the first flared section is greater than a diameter of the middle pipe section, and a first limit platform is formed at a connection position between the middle pipe section and the flared section;
  the first limit platform limits an installed steel pipe body in an axis direction; a diameter of the second flared section is greater than the diameter of the first flared section, and a second limit platform is formed at a connection position between the first flared section and the second flared section;
  the sealing component comprises a sealing ring, a high temperature sealing ring, and a teeth ring;
  an inner ring of the sealing ring, an inner ring of the high temperature sealing ring, and an inner ring of the teeth ring form a space for nesting the steel pipe body;
  the second limit platform limits the sealing ring in an axis direction;
  wherein at least one side of the high temperature sealing ring is recessed inwardly to form one groove.

2. The compression teeth ring connection pipe fitting according to claim 1, wherein the second flared section is inwardly formed and provided with a first annular boss in a radial direction;
  the second flared section has a maximum wall thickness at the first annular boss, and a sealing ring limit groove is formed between the first annular boss and the second limit platform to accommodate the sealing ring;

an inner diameter of the first annular boss is larger than an outer diameter of the high temperature sealing ring.

3. The compression teeth ring connection pipe fitting according to claim 2, wherein a second annular boss is formed inwardly at an edge of a socket of the second flared section in the radial direction;

a teeth ring limit groove is formed between the first annular boss and the second annular boss to accommodate the teeth ring.

4. The compression teeth ring connection pipe fitting according to claim 1, wherein the second flared section has a same wall-thickness at each position of the second flared section.

5. The compression teeth ring connection pipe fitting according to claim 1, wherein at least one side of the high temperature sealing ring is recessed inwardly to form multiple grooves, the multiple grooves are spaced along the high temperature sealing ring in a radial direction.

6. The compression teeth ring connection pipe fitting according to claim 1, wherein an opening of the groove gradually increases from an inside to an outside.

7. The compression teeth ring connection pipe fitting according to claim 5, wherein an opening of each groove gradually increases from an inside to an outside.

8. The compression teeth ring connection pipe fitting according to claim 6, wherein a cross-sectional shape of the groove is trapezoidal or triangular.

9. The compression teeth ring connection pipe fitting according to claim 1, wherein two end surfaces of the high temperature sealing ring are planar surface and the high temperature sealing ring has a same wall-thickness at each point.

10. The compression teeth ring connection pipe fitting according to claim 1, wherein the high temperature sealing ring is made of stainless steel, copper, or graphite.

11. The compression teeth ring connection pipe fitting according to claim 1, wherein the teeth ring comprises a teeth ring body and an inner ring protruding from the teeth ring body, and the inner ring is a toothed shaped structure;

the teeth ring body is in an open loop structure;

the toothed structure is configured to insert into the steel pipe body when being subjected to a mutual compression with the steel pipe body.

12. The compression teeth ring connection pipe fitting according to claim 11, wherein the teeth ring body is in a "C" shaped structure and is made of a radially shrinkable metal material.

13. The compression teeth ring connection pipe fitting according to claim 11, wherein the toothed structure comprises multiple teeth spaced along an extension direction of the teeth ring body, and the teeth are extended from the inner ring of the teeth ring body towards an axis direction of the teeth.

14. The compression teeth ring connection pipe fitting according to claim 13, wherein the toothed shaped structure is arranged in two rows, and some teeth of the two rows of the toothed shaped structure are faced with each other.

15. The compression teeth ring connection pipe fitting according to claim 14, wherein some teeth are misaligned with each other.

16. The compression teeth ring connection pipe fitting according to claim 13, wherein the toothed structure is arranged in a row, and multiple teeth of the row of toothed shaped structure are arranged at equal intervals.

17. The compression teeth ring connection pipe fitting according to claim 13, wherein multiple teeth of the toothed shaped structure are provided at one edge of at least one side of the teeth ring body.

* * * * *